United States Patent [19]
Arnes

[11] 3,768,778
[45] Oct. 30, 1973

[54] LIFT CARRIAGE

[75] Inventor: Lyle L. Arnes, Racine, Wis.

[73] Assignee: Tenneco Inc., Racine, Wis.

[22] Filed: June 11, 1971

[21] Appl. No.: 152,219

[52] U.S. Cl. ............................................. 254/2 B
[51] Int. Cl. ............................................. B60p 1/00
[58] Field of Search ............. 254/2, 93 H, DIG. 1, 254/7, 8

[56] References Cited
UNITED STATES PATENTS

| | | | |
|---|---|---|---|
| 3,595,525 | 7/1971 | Yaste | 254/2 B |
| 1,295,463 | 2/1919 | Flair | 254/8 R |
| 3,361,408 | 1/1968 | Strang et al. | 254/2 |
| 3,606,246 | 9/1971 | Harrah | 254/2 B |
| 3,165,295 | 1/1965 | Nolden | 254/2 B |
| 2,973,184 | 2/1961 | Trautman et al. | 254/2 B |

Primary Examiner—Othell M. Simpson
Assistant Examiner—Robert C. Watson
Attorney—J. King Harness et al.

[57] ABSTRACT

A lifting jack has a base that is provided with rear wheels and a front caster plate which is movable between operative and inoperative positions and arranged so that it may be held in the operative position by the lift carriage of the jack.

6 Claims, 3 Drawing Figures

Patented Oct. 30, 1973   3,768,778
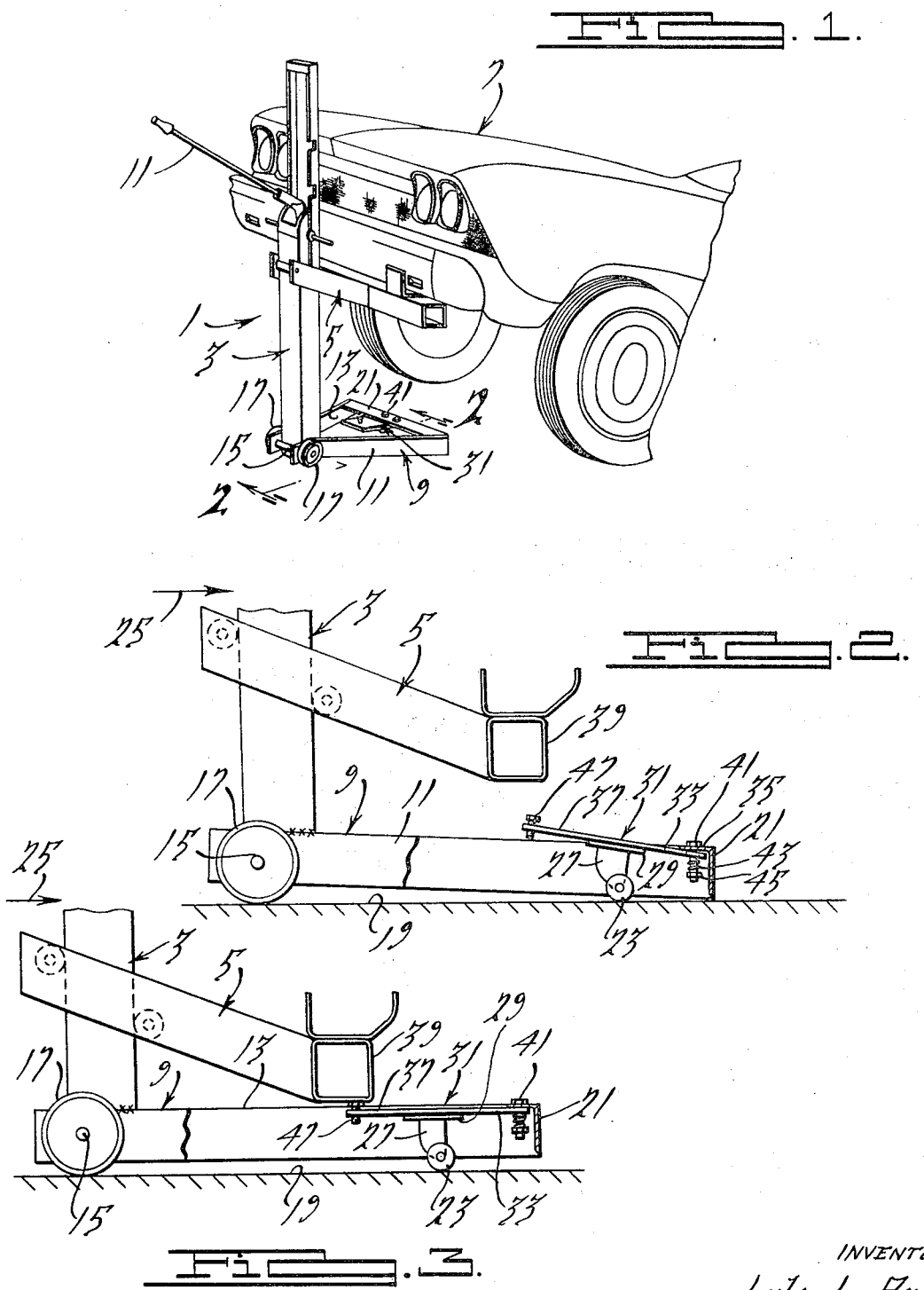

LIFT CARRIAGE

BACKGROUND OF THE INVENTION

Many jacks of the one-end lift type, such as that shown in U. S. Pat. No. 2,973,184, have a wheeled base that permits the jack to be easily moved from one place to another. These jacks often have caster plates mounted at the front of the base and carrying a wheel to facilitate movement. The caster plate and wheel are mounted in such a way that when the jack is under load the wheel moves to an inoperative position and the base engages the ground to furnish a solid platform for the jack.

Casters of this type are not completely satisfactory because they respond to a pushing force on the jack when it is moved forwardly from one place to another. The response consists in moving toward an inoperative position and allowing the front of the jack base to dive toward the ground thereby reducing ground clearance, if not eliminating it so that the base digs into the ground.

BRIEF SUMMARY OF THE INVENTION

It is the purpose of this invention to provide a caster and a caster mounting for the base of a jack or the like that is of a structure that overcomes the problem of diving.

The invention accomplishes this purpose by attaching the caster wheel to a central portion of a mounting plate. One side of the plate, with respect to the wheel axis, is connected to the base and the opposite side is arranged to be contacted by suitable hold down means, preferably, the lift carriage of the jack. When the mounting plate is operatively engaged by the lift carriage, the caster wheel is held in an operative position so that the jack can be moved about without the possibility of diving; and when the lift carriage is out of contact with the mounting plate the caster may be deflected to an inoperative position by a load on the jack.

DESCRIPTION OF THE DRAWINGS

FIG. 1 is a perspective view of a typical one end lift type jack embodying the invention;

FIG. 2 is an enlarged section, partly schematic and partly broken away, taken along the line 2—2 of FIG. 1; and FIG. 3 is a view similar to FIG. 2 but showing the carriage in engagement with the caster mounting plate.

DESCRIPTION OF THE INVENTION

The jack 1 of the drawings may be of various specific constructions but is illustrated as being a type shown in U. S. Pat. No. 2,973,184. Thus, it has a vertical column 3 which receives the load from a lift carriage 5, such load being illustrated as an automobile 7, and transmits it into a base 9 which in turn transmits it to the ground. The carriage 5 is movable vertically on the column 3 by a suitable force applying means that may be manually operated by the pump handle 11.

The base structure 9 includes a pair of diverging side members 11 and 13 which are welded or otherwise suitably attached to the bottom of the column 3. They are provided with suitable openings to support an axle 15 for a pair of wheels 17 which engage the surface 19 of the ground and transmit a part of the jack load into the ground. At the front end of the base 9 is a cross member 21 which is welded to the front ends of the side members 11 and 13. When the jack is under load as indicated in FIGS. 1 and 2 the bottom edge of the cross member 21 will engage the ground surface 19 so that it acts in conjunction with the two wheels 17 to provide a solid platform for the jack.

In order to facilitate movement of the jack 1 from one place to another a caster wheel 23 is connected to approximately the midpoint of the cross member 21. When it is in operative position, as shown in FIG. 3, the jack is supported by three wheels and the base 9 is elevated from the ground surface 19 so that it is easy for an operator to move the jack from place to place. It will be recognized that when a pushing force in the direction of the arrow 25 is applied to the jack so as to move it in a forward direction the tendency will be for the front end of the base 9 to dive or dig into the ground surface 19. It is the object of this invention to mount the wheel 23 on the base 9 in such a manner that this tendency may be eliminated.

Accordingly, the bracket 27 which rotatably carries the caster 23 is bolted or welded by way of its top flange 29 to the bottom of a mounting plate 31 which may be of rectangular shape as seen best in FIG. 1. The bracket 27 is secured to the plate at a selected location in a central portion of the plate. There is therefore a front portion 33 of the plate which extends beneath the horizontal flange 35 of the angle bar cross member 21 and a rear portion 37 which extends beneath the cross beam 39 of the lift carriage 5. The plate 31 is mounted on the cross member 21 and this connection comprises two or more holes at the forward end of the plate section 33 and bolts 41 which pass through holes in the flange 35 of member 21 and through the holes in the plate section 33. Coil springs 43 are disposed on the bolts 41 and held under compression against the bottom of the plate section 33 by means of nuts 45. It will be seen that the springs 43 provide a little lift to the base 9 since they urge the plate 31 to fit flatly against the bottom of flange 35 in which position the plate 31 will be horizontally disposed in a position more or less parallel to the ground surface 19. The holes in the plate 33 are oversize so that the plate can rock or tilt about the axle of the caster 23 thereby permitting the cross bar 21 to engage the ground as shown in FIG. 2.

The rear section 37 of plate 31 has a bumper bolt 47 threaded into it, preferably along a center line of the plate. Bolt 47 is in alignment with the bottom of the lift beam 39. As can be seen by comparing FIGS. 2 and 3, when the lift beam 39 is lowered to the proper level it engages the bolt 47 to hold the plate 31 in a substantially horizontal position and restrains it against pivoting upwardly as a result of forces on the jack applied in the direction of arrow 25. When the jack is in use, however, the lift carriage will move to a higher level, releasing the bolt 47 and plate 31 so that it can pivot to an inoperative position as shown in FIG. 2 in response to a load on the jack.

It is apparent that the caster 23 and plate 31 assembly is a simple lever with the caster wheel the fulcrum point. The jack base 9 is lifted off the ground when the weight of the carriage 5 multiplied by its lever arm (the distance from bolt 47 to the axle of wheel 23) is greater than the weight of the base 9 multiplied by its lever arm (the distance from bolts 41 to the axle of wheel 23). For any combination of carriage weight and base weight a satisfactory lever can be computed. The bolt 47 can be adjusted to provide the degree of ground clearance desired.

Modifications in the specific structure shown may be made without departing from the spirit and scope of the invention.

I claim:

1. A lifting jack comprising a base, a vertical column supported on the base, a carriage supported on the column for vertical movement, said base extending horizontally from the column and including a horizontal member spaced horizontally a substantial distance from the column, first wheel means mounted on the base for rolling on a horizontal surface and having a fixed vertical position, second wheel means mounted on the base for rolling on a horizontal surface and movable in a vertical direction between an operative position and an inoperative position, and hold down means engageable with the second wheel means for holding it in an operative position, said second wheel means including a lever rockably connected to the base and a caster wheel carried by the lever having an axle serving as the fulcrum of the lever, said lever being rockably connected at one end to said horizontal member of the base, said caster wheel being located intermediate the ends of the lever and the other end of the lever being engageable with the carriage whereby said carriage serves as said hold down means.

2. A jack as set forth in claim 1 including an adjustable bumper member acting between the lever and carriage.

3. A lifting jack comprising a base, a vertical column supported on the base, a carriage supported on the column for vertical movement, said base extending horizontally from the column and including a horizontal member spaced horizontally a substantial distance from the column, first wheel means mounted on the base for rolling on a horizontal surface and having a fixed vertical position, second wheel means mounted on the base for rolling on a horizontal surface and movable in a vertical direction between an operative position and an inoperative position, hold down means engageable with the second wheel means for holding it in an operative position, said horizontal member including a horizontal flange, said second wheel means including a plate and a caster wheel mounted on a central portion of the plate so that the axle of the wheel serves as a fulcrum for rocking movement of the plate, one end of the plate being rockably connected to said horizontal flange, spring means acting on the one end to urge the plate to a horizontal position, the other end of the plate having an adjustable bumper screw engageable by said carriage when the carriage is in a lowered position whereby said carriage serves as said hold down means.

4. A lifting jack comprising a base, a vertical column supported on the base, a carriage supported on the column for vertical movement, said base extending horizontally from the column and including a horizontal member spaced horizontally a substantial distance from the column, first wheel means mounted on the base for rolling on a horizontal surface and having a fixed vertical position, second wheel means mounted on the base for rolling on a horizontal surface and movable in a vertical direction between an operative position and an inoperative position, and hold down means engageable with the second wheel means for holding it in an operative position, said hold down means comprising said carriage.

5. A lifting jack comprising a base, a vertical column supported on the base, a carriage supported on the column for vertical movement, said base extending horizontally from the column and including a horizontal member spaced horizontally a substantial distance from the column, first wheel means mounted on the base for rolling on a horizontal surface and having a fixed vertical position, second wheel means mounted on the base for rolling on a horizontal surface and movable in a vertical direction between an operative position and an inoperative position, and hold down means engageable with the second wheel means for holding it in an operative position, said second wheel means including a lever rockably connected to the base and a caster wheel carried by the lever having an axle serving as the fulcrum of the lever.

6. A jack as set forth in claim 5 wherein said lever is rockably connected at one end to said horizontal member of the base.

* * * * *